(12) United States Patent  
Goetz

(10) Patent No.: US 9,982,835 B2  
(45) Date of Patent: May 29, 2018

(54) ROLLER BRUSH MOUNTING ASSEMBLY

(71) Applicant: John Bean Technologies Corporation, Chicago, IL (US)

(72) Inventor: Robert R. Goetz, Garden Grove, CA (US)

(73) Assignee: John Bean Technologies Corporation, Chicago, IL (US)

( * ) Notice: Subject to any disclaimer, the term of this patent is extended or adjusted under 35 U.S.C. 154(b) by 0 days. days.

(21) Appl. No.: 15/666,165

(22) Filed: Aug. 1, 2017

(65) Prior Publication Data

US 2017/0328516 A1  Nov. 16, 2017

Related U.S. Application Data

(63) Continuation of application No. 14/970,129, filed on Dec. 15, 2015, now Pat. No. 9,726,318.

(51) Int. Cl.
| | |
|---|---|
| *F16M 11/00* | (2006.01) |
| *F16M 13/02* | (2006.01) |
| *F16M 11/04* | (2006.01) |
| *A46B 13/02* | (2006.01) |
| *A46B 13/00* | (2006.01) |
| *A23N 12/02* | (2006.01) |

(52) U.S. Cl.
CPC .............. *F16M 13/02* (2013.01); *A23N 12/02* (2013.01); *A46B 13/001* (2013.01); *A46B 13/02* (2013.01); *F16M 11/041* (2013.01)

(58) Field of Classification Search
CPC ....... Y10T 279/17769; Y10T 279/1008; Y10T 408/95; Y10T 409/30952; Y10T 279/1045; Y10T 83/9481; Y10T 279/17923

USPC .................................. 248/110; 279/2.03, 77
See application file for complete search history.

(56) References Cited

U.S. PATENT DOCUMENTS

| | | |
|---|---|---|
| 1,190,383 A | 7/1916 | Court |
| 1,543,411 A | 6/1925 | Wittig |
| 2,472,184 A | 6/1949 | Anest |
| 2,548,534 A | 4/1951 | Hutchison, Jr. |

(Continued)

FOREIGN PATENT DOCUMENTS

| | | |
|---|---|---|
| DE | 197 14 181 A1 | 10/1998 |
| EP | 0 310 942 A1 | 9/1988 |

(Continued)

OTHER PUBLICATIONS

International Search Report and Written Opinion dated Mar. 27, 2017, issued in corresponding International Application No. PCT/US2016/065785, filed Dec. 9, 2016, 13 pages.

(Continued)

*Primary Examiner* — Steven M Marsh  
(74) *Attorney, Agent, or Firm* — Christensen O'Connor Johnson Kindness PLLC

(57) ABSTRACT

A mounting assembly 10 for mounting a roller brush 12 onto an operating apparatus includes a mounting structure 14 configured to be mountable on the operating apparatus. The mounting structure has a through hole for receiving an idle shaft 16 that is sized to be engageable within a blind hole 42 formed in the adjacent end hub 32 of the brush 12. The idle shaft 16 is resiliently loaded in the direction toward the brush hub 12 by a loader assembly 18 which includes a compression spring 16 acting against retaining ring 48 engaged with the idle shaft 16.

20 Claims, 3 Drawing Sheets

(56) References Cited

U.S. PATENT DOCUMENTS

| | | | |
|---|---|---|---|
| 2,686,683 | A | 8/1954 | Fausel |
| 3,189,340 | A | 6/1965 | Desel |
| 4,674,172 | A | 6/1987 | Botimer |
| 4,850,765 | A | 7/1989 | Ramunas |
| 5,203,259 | A * | 4/1993 | Miedema ............... A23N 15/02 492/36 |
| 5,780,088 | A | 7/1998 | Zittel et al. |
| 5,868,400 | A | 2/1999 | Davis |
| 6,343,901 | B2 | 2/2002 | Wheeler |
| 6,710,357 | B1 | 3/2004 | Schweitzer |
| 7,540,058 | B1 | 6/2009 | Day |
| 7,849,999 | B1 | 12/2010 | Cooley et al. |
| 8,763,815 | B2 | 7/2014 | Pellenc et al. |
| 9,265,279 | B2 * | 2/2016 | Le Neve ............... A01D 46/285 |
| 9,452,448 | B2 * | 9/2016 | Dettmer ................. A01D 33/04 |
| 9,511,164 | B2 | 12/2016 | Dayton |
| 9,579,692 | B2 * | 2/2017 | Le Neve ............... A01D 46/285 |
| 2009/0057208 | A1 | 3/2009 | Pellenc et al. |

FOREIGN PATENT DOCUMENTS

| | | |
|---|---|---|
| EP | 1 018 306 A1 | 7/2000 |
| WO | 03/089188 A1 | 10/2003 |

OTHER PUBLICATIONS

Invitation to Pay Additional Fees and, Where Applicable, Protest Fee from the International Searching Authority dated Sep. 27, 2017, issued in corresponding International Application No. PCT/US2017/037513, filed Jun. 14, 2017, 10 pages.

* cited by examiner

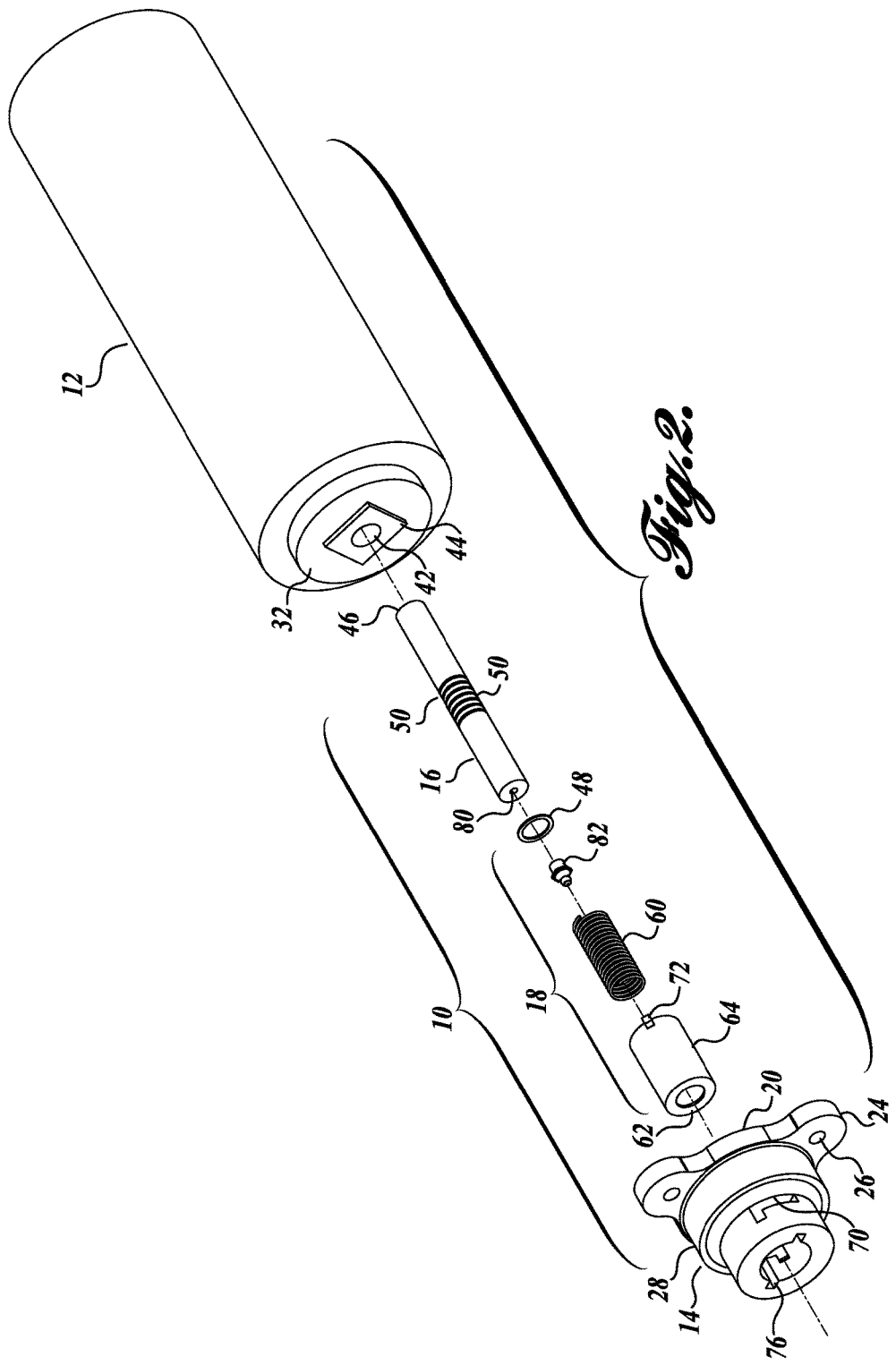

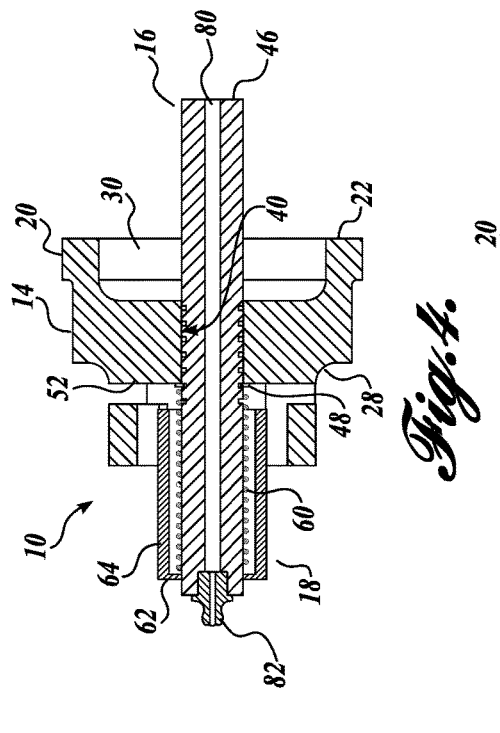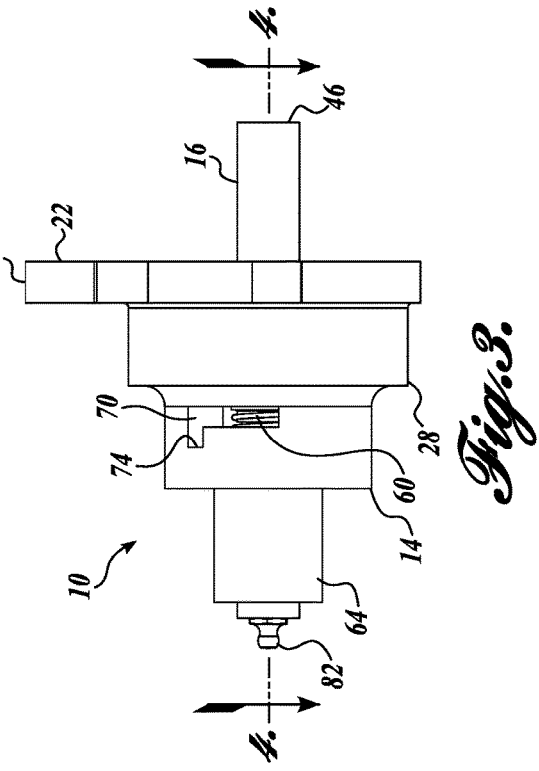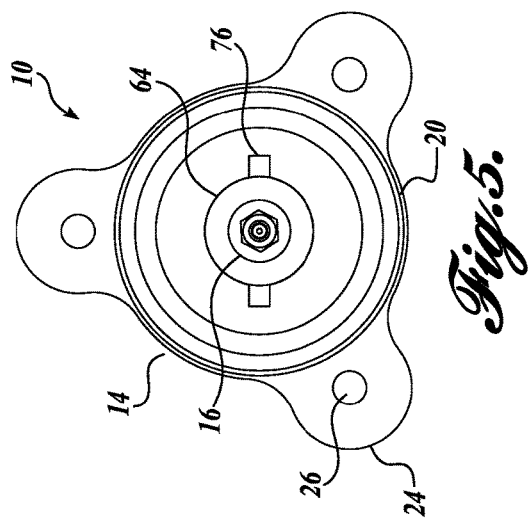

US 9,982,835 B2

ROLLER BRUSH MOUNTING ASSEMBLY

BACKGROUND

As safety in food processing becomes more strict, there is an increasing need and requirement for processors of produce, fruits, and other types of foods, to clean all equipment surfaces and components that touch food during processing. Machines filled with roller brushes are commonly used to clean produce and fruit once harvested. Typically there are a large number of brushes mounted on the machine side-by-side to each other and in close proximity to each other, thereby to cooperatively form a bed of brushes on which the produce or fruit travel while being cleaned by the rotating brushes.

Periodically, the roller brushes must be removed from the machines for cleaning of the brushes or for replacement of broken or otherwise damaged brushes. This usually requires multiple personnel and is time consuming and difficult. Removing the brushes from the machine drive system often requires removal of machine panels, loosening of bolts or other fasteners, and disassembly of a drive or idler shaft to remove the brush from the cleaning machine.

The present disclosure addresses the need for efficiently installing and removing food (including produce/fruit), cleaning roller brushes from a cleaning apparatus.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A mounting assembly for mounting a roller brush on a cleaning apparatus, wherein the roller brush has an end structure with a longitudinal blind bore formed therein, the mounting assembly including a mounting housing configured to be mountable on the cleaning apparatus. A longitudinal hole extends at least partially through the mounting housing to receive an idle shaft. The idle shaft projects from the mounting housing to support the adjacent end of the roller brush. In this regard, the idle shaft extends into the blind bore formed in the brush end structure.

Further, a loader assembly imposes a load on the idle shaft to urge the idle shaft into engagement with the longitudinal bore of the brush end structure, while also enabling the idle shaft to retract relative to the mounting structure in a direction opposite to the direction of engagement of the idle shaft with the longitudinal bore of the brush end structure under the movement of the roller brush toward the mounting housing.

By the foregoing structure, roller brushes may be installed on the cleaning apparatus by simply engaging the blind bore of the brush end structure over the idle shaft and then pushing the brush horizontally toward the mounting assembly, thereby causing the idle shaft to retract in the direction of the mounting housing. This enables the opposite end of the roller brush to be aligned and engaged with a drive mechanism employed to rotatably drive the roller brush. The force of the loader assembly will maintain the roller brush in secure engagement with its drive mechanism.

To remove the roller brush, the brush need only be pushed horizontally toward the housing until the opposite end of the roller brush disengages from its drive mechanism so that such opposite end can be swung sufficiently clear of the drive mechanism and thereafter enable the brush to be shifted or moved sufficiently away from the mounting structure to disengage the idle shaft from the brush and hub.

In accordance with a further aspect of the present disclosure, a stop is provided to limit the distance that the idle shaft projects from the mounting housing into engagement with the longitudinal bore of the brush end structure.

In accordance with a further aspect of the present disclosure, the mounting housing is constructed with a recess for receiving the adjacent end structure of a roller brush.

In accordance with a further aspect of the present disclosure, the loader assembly applies a resilient load on the idle shaft along the length of the idle shaft in the direction towards the brush end structure.

In accordance with a further aspect of the present disclosure, the loader assembly includes a spring acting on the idle shaft to urge the idle shaft into engagement with the longitudinal bore of the brush end structure. The spring also enables the idle shaft to retract relative to the mounting housing under the movement of the roller brush toward the mounting housing.

In accordance with a further aspect of the present disclosure, the loader assembly also includes a loader housing extending from the mounting housing for engaging over the spring, which in turn is engaged over a corresponding section of the idle shaft, the loader housing providing an abutment for the distal end of the spring.

In accordance with a further aspect of the present disclosure, the loader housing is configured to be removably attachable to the mounting housing.

In accordance with a further aspect of the present disclosure, the loader assembly includes a retainer engageable with the idle shaft. The retainer is configured to bear against the proximal end of the spring, whereby the spring urges the idle shaft into engagement with the longitudinal bore of the brush end structure.

In accordance with a further aspect of the present invention, the idle shaft has portions defining a longitudinal bore extending therethrough, the bore adapted to hold lubricant therein. A system is provided for introducing lubricant into the longitudinal bore of the idle shaft.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is an isometric, exploded view of FIG. 1 illustrating the components of the roller brush mounting assembly of the present disclosure;

FIG. 3 is a side elevational view of the roller brush mounting assembly shown in FIGS. 1 and 2;

FIG. 4 is a cross-sectional view of FIG. 3 taken along lines 4-4 thereof; and

FIG. 5 is an end view of FIG. 3.

DETAILED DESCRIPTION

Figure 1:
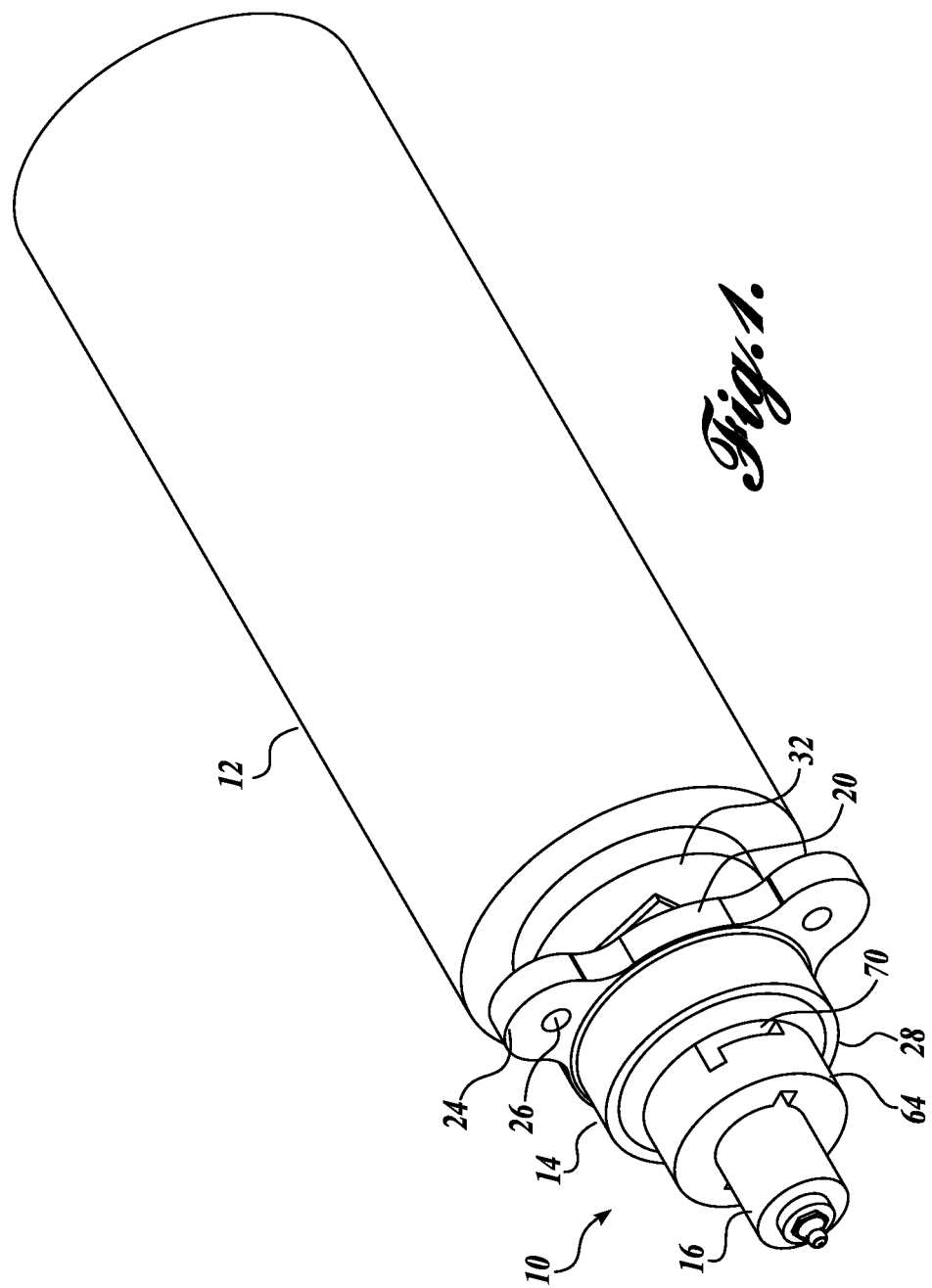
FIG. 1 is an isometric view of the roller brush mounting assembly of the present disclosure shown assembled with a roller brush.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "upward," "downward," "right hand," "left hand," "in," "out," "extended," "advanced," "retracted," "proximal," and "distal." These references and other similar references in the present application are only to assist in helping describe and understand the present invention and are not intended to limit the present invention to these directions.

The present application may include modifiers such as the words "generally" or "substantially." These terms are meant to serve as modifiers to indicate that the "dimension," "shape," or other physical parameter, in question need not be exact, but may vary as long as the function that is required to be performed can be carried out. For example, in the phrase "generally circular in shape," the shape need not be exactly circular as long as the required function of the structure in question can be carried out.

In the following description, various embodiments of the present disclosure are described. In the following description and in the accompanying drawings, the corresponding systems assemblies, apparatus and units may be identified by the same part number, but with an alpha suffix. The descriptions of the parts/components of such systems assemblies, apparatus, and units are the same or similar are not repeated so as to avoid redundancy in the present application.

The present disclosure pertains to a mounting assembly 10 for mounting brushes, such as elongate roller brush 12 shown in FIG. 1 on a fruit cleaning apparatus (not shown) for cleaning produce, fruits, and other types of fruit products. In basic form, the mounting assembly 10 includes a mounting housing 14 configured to be mountable on the cleaning apparatus. The mounting housing 14 receives and supports and idle shaft or pin 16 for extending toward a longitudinal end of brush 12 to engage with and rotatably support the brush. In addition, a loader assembly 18 applies a resilient load on the idle shaft 16 in the direction toward the brush 12 while also permitting the idle shaft 16 to retract or otherwise move relative to the mounting assembly 10 in a direction opposite to the direction of engagement of the idle shaft 16 with the brush 12.

As a consequence, the brush 12 can be pushed horizontally toward the mounting assembly 10 causing the brush 12 to disengage from its drive mechanism (not shown) at the opposite end of the brush, thereby allowing the brush to be removed from the cleaning apparatus. Correspondingly, a clean brush may be installed by simply engaging the idle shaft 16 with the adjacent end of the brush 12 and pushing the brush 12 against the idler shaft which retracts a sufficient distance to allow the opposite end of the brush to be engaged with the brush drive mechanism. Once the opposite end of the brush is aligned with the brush drive mechanism, the push tension on the brush is simply released so that the brush drive end is seated on the drive mechanism. The present mounting assembly enables a singular person to quickly install or uninstall brush 12 without having to remove panels of the cleaning apparatus, remove bolts, screws, or other types of fasteners, or otherwise disassemble portions of the brush mounting system or the cleaning apparatus.

The above general components of the mounting assembly 10 are described more fully below, as well as other components and features of the mounting assembly 10.

Referring to the figures, the mounting housing 14 includes a mounting flange portion 20 having a flat mounting surface 22 for mounting the housing 14 to a cleaning apparatus (not shown). Mounting flange portion 20 includes three spaced-apart mounting ears 24 with through holes 26 formed therein through which bolts, screws, or other hardware members can be used to securely attach the mounting housing 14 to the cleaning apparatus. Of course, other structures or methods can be employed to mount the mounting housing 14 on the cleaning apparatus.

The mounting housing 14 also includes a hub portion 28 projecting distally (leftward in FIGS. 1-4). The hub portion 28 has a first, larger diameter section adjacent the mounting flange 20 and a second, reduced diameter section in the distal direction, the direction away from the mounting flange 20. An insert cavity 30 is formed in the interior of the mounting flange 20 and adjacent hub portion 28 to allow the brush end hub 32 to be pushed into the insert cavity during assembly and disassembly of the brush 12, as noted above and as more fully described below. A bore or through hole 40 extends centrally through the hub portion 28 of the mounting housing for receiving therein the idle shaft 16. The through hole 40 is sized to enable the idle shaft 16 to slide longitudinally within the through hole. The idle shaft 16 is in turn sized to engage within a blind bore 42 formed in an insert 44 engaged within the adjacent brush end hub 32. The projecting end 46 of the idle shaft 16 bottoms against the end of the blind bore 42.

The mounting housing 14 is, overall, generally circular in shape to facilitate the manufacture thereof. However, the mounting housing can be in other overall shapes to still perform the functions described herein.

The standout of the idle shaft 16 relative to the mounting housing 14 in the direction toward the brush 12 may be adjusted by the position selected for a stop structure in the form of a retainer 48 along the length of the idle shaft 16. As shown in FIGS. 1 and 4, idle shaft 16 is constructed with a plurality of circular grooves 50 spaced along its length, with the grooves sized to received retainer ring 48 therein. Referring specifically to FIG. 4, the stop/retainer is in the form of a retaining ring 48 that abuts against the adjacent face 52 of the mounting housing hub to control the standout of the idle shaft 16. This enables the idle shaft 16 to be positioned properly relative to the brush end hub 32 so that the idle shaft bottoms against the end of the blind bore 42 when the brush 12 is in stalled position. It will be appreciated that the stop/retainer 48 can be placed in any of the grooves 50 depending on the depth of the blind bore 42.

The idle shaft 16 is nominally urged or loaded in the direction toward the brush end hub 32 by a loader compression spring 60 which, at its proximal end, pushes against the retaining ring 48 and, at its distal end, pushes against the end wall 62 of a loader housing 64. The loader housing 64 is generally cylindrical in shape with end wall 62 at its distal end. A central opening is formed in the end wall 62 through which idle shaft 16 projects distally. The loader housing 64 extends into a counter bore formed in the distal end of hub portion 28 and is attached to the hub portion by a bayonet-type connection. In this regard, L-shape slots 70 are formed diametrically opposite to each other in the reduce diameter portion of the hub portion 28. A pair of diametrically opposite pins 72 extend radially outwardly from the outer surface of the proximal end of the loader housing 64 to engage slots 70, whereupon the loader housing 64 can be rotated to enable the pins to bottom against the end portions 74 of the slots, see FIG. 3. Clearance for the pins 72 in the interior (counter bore) of the hub portion 28 is provided by radial grooves 76 formed in the counter bore (see FIG. 5). It will be appreciated that when the loader housing 64 is assembled with the mounting housing 14 and the pins 72 seated against the slot ends 74, a load is applied to the loader housing 64 by the spring 60 which causes the loader housing to remain securely engaged with the mounting housing 14.

Of course, other methods and systems may be utilized to assemble the loader housing 64 with the mounting housing 14, including by using threads so that the loader housing 64 may be screwed into engagement with the mounting flange 20. Also, it will be appreciated that other means can be utilized to apply a resilient load on the idle shaft 16 in place of spring 60, for example, by use of a bellows arrangement.

As shown in FIG. 4, a longitudinal bore 80 extends through the length of the idle shaft 16 to receive and store therein a lubricant, which may include a grease component. To this end, a grease fitting 82, such as a Zerk fitting, is installed in the distal end of the idle shaft 16 through which lubricating grease may be introduced into the bore 80. Of course, other types of lubricants, such as graphite-based lubricants, can be used in addition or in the alternative.

Once the mounting assemblies 10 have been assembled and mounted onto a cleaning apparatus, brushes 12 may be installed by simply engaging the blind bore 42 in the brush hub 32 over the idle shaft 16 and pushing the brush horizontally toward the mounting assembly 10, thereby causing the idle shaft 16 to retract or move in the distal (left hand) direction, compressing spring 60. This enables the opposite end of the brush 12 to be aligned and engaged with a drive mechanism employed to rotatably drive the brush 12. The force of spring 60 on the brush 12 will maintain the brush 12 in secure engagement with its drive mechanism.

To remove the brush 12, the brush need only be pushed horizontally toward the housing 14 until the opposite end of the brush disengages with its drive mechanism so that such opposite end can be swung sufficiently to clear the drive mechanism and thereafter allow the brush to be shifted or moved sufficiently away from the mounting assembly 10 to disengage the idle shaft 16 from the brush end hub 32. It will be appreciated that during the shifting of the brush 12 towards the mounting housing 14, clearance is provided for the brush end hub 32 via the inset cavity 30 formed in the mounting housing 14.

While illustrative embodiments of the present disclosure have been illustrated and described, it will be appreciated that various changes can be made therein without departing from the spirit and scope of the present invention. In this regard, the mounting housing 14 can be constructed as a singular unit as described above, or can be composed of separate components assembled together to perform the function of the mounting housing 10 described above. Moreover, if constructed as a single unit, the mounting housing 10 can be manufactured by different techniques, including by casting, molding, forging, or machining from stock material.

Also, as mentioned above, other means can be utilized for applying a resilient load on idle shaft 16 in place of the compression spring 60. One example would be to use a bellows arrangement in place of the spring 60. Of course, other types of resilient loading systems or mechanisms may be used instead.

Further, the retaining ring 48 can be of various types, including e-clips, snap rings, or split rings.

In addition, the mounting assembly could be constructed so that the mounting housing and load housing are constructed as a singular unit having a through bore or blind bore for receiving the idle shaft, and also optionally the loader spring, therein.

In addition, rather than forming the idle shaft 16 with a plurality of grooves for receiving a retainer therein which dictates the standout of the idle shaft from the mounting housing, other means can be used to control the standout of the idle shaft. For example, idle shafts of different lengths can be provided to correspond to the various depths of the blind bores formed in the ends of the roller brushes.

The embodiments of the invention in which an exclusive property or privilege is claimed are defined as follows:

1. A mounting assembly for mounting a roller brush on an operating apparatus, the roller brush having an end structure with a longitudinal bore of a depth formed in the end structure of the roller brush, the roller brush moveable along a path longitudinally of its length during mounting to the mounting assembly, the mounting assembly comprising:
   (a) a mounting structure configured to be mountable on an operating apparatus, the mounting structure having portions defining a longitudinal guide extending at least partially through the mounting structure;
   (b) an idle shaft disposed within the guide of the mounting structure with a portion of the idle shaft projecting from the mounting structure, the projecting portion of the idle shaft engageable with a longitudinal bore of a brush end structure; and
   (c) a loader assembly imposing a load on the idle shaft to urge the projecting portion of the idle shaft in an engagement direction into engagement within the longitudinal bore of the brush end structure and also enabling the idle shaft to retract toward the mounting structure in a direction opposite to the engagement direction the idle shaft within the longitudinal bore of the brush end structure under the movement of the roller brush toward the mounting structure.

2. A roller brush mounting assembly according to claim 1, wherein the mounting structure has portions defining a recess therein for receiving the brush end structure.

3. A roller brush mounting assembly according to claim 1, wherein the mounting housing has portions defining flanges for mounting the mounting housing to an operating apparatus.

4. A roller brush mounting assembly according to claim 1, wherein the mounting structure is generally circular in shape and the longitudinal guide is located generally centrally relative to the mounting structure.

5. A roller brush mounting assembly according to claim 1:
   wherein the idle shaft is elongate in structure; and
   wherein the loader assembly comprises a loader to apply a resilient load on the idle shaft along the length of the idle shaft in the direction of engagement of the idle shaft with the longitudinal bore of the brush end structure.

6. A roller brush mounting assembly according to claim 5, wherein the loader assembly comprises a spring acting on the idle shaft to urge the idle shaft into engagement with the longitudinal bore of the brush end structure, the spring acting to enable the idle shaft to retract relative to the mounting structure under the movement of the roller brush toward the mounting structure.

7. A roller brush mounting assembly according to claim 6, wherein the spring is engaged over the idle shaft, the spring having a proximal end toward the brush end structure and a distal end away from the brush end structure.

8. A roller brush mounting assembly according to claim 7, wherein the loader assembly further comprises a loader structure extending from the mounting structure for engaging over the spring which in turn is engaged over a corresponding section of the idle shaft, the loader structure defining an abutment for the distal end of the spring.

9. A roller brush mounting assembly according to claim 8, wherein the loader structure is configured to be removably attachable to the mounting structure.

10. A roller brush mounting assembly according to claim 9, wherein the loader assembly further comprises a retainer engageable with the idle shaft, the retainer configured to bear against the proximal end of the spring, whereby the spring urges the idle shaft into engagement with the longitudinal bore of the brush end structure.

11. A roller brush mounting assembly according to claim 10, wherein at least one groove is formed in the idle shaft for receiving the retainer.

12. A roller brush mounting assembly according to claim 11, wherein a plurality of grooves are formed in the idle shaft for receiving the retainer within a selected one of the plurality of grooves.

13. A roller brush mounting assembly according to claim 6, further comprising a retainer engageable with the idle shaft against which one end of the spring bears when urging the idle shaft into engagement with the longitudinal bore of the brush end structure.

14. A roller brush mounting assembly according to claim 13, wherein a plurality of grooves are formed in the idle shaft for receiving the retainer in a selected one of the plurality of grooves, the retainer engaging with the adjacent end of the spring.

15. A roller brush mounting assembly according to claim 1, wherein the idle shaft has portions defining a longitudinal bore extending therethrough, the longitudinal bore adapted to hold lubricant therein.

16. A roller brush mounting assembly according to claim 15, further comprising a fitting disposed in communication with the longitudinal bore of the idle shaft through which lubricant is introducible into the longitudinal bore of the idle shaft.

17. A mounting assembly for mounting a roller brush on a food processing apparatus, the roller brush having an end structure with a longitudinal bore of a depth formed in the end structure of the roller brush, the mounting assembly comprising:
(a) a mounting housing configured to be mountable on a processing apparatus, the mounting housing having portions defining a bore extending at least partially through the mounting housing;
(b) an elongate idle shaft disposed within the mounting housing guide and projecting a distance from the mounting housing to be engageable with a longitudinal bore of a brush end structure;
(c) a loader assembly imposing a resilient load on the idle shaft to urge the idle shaft into engagement with the longitudinal bore of the brush end structure and enabling the idle shaft to move relative to the mounting housing in a direction opposite to the engagement of the idle shaft with the longitudinal bore of the brush end structure; and
(d) a stop acting on the idle shaft to limit the distance that the idle shaft projects from the mounting housing into engagement with the longitudinal bore of the brush end structure.

18. A roller brush mounting assembly according to claim 17, wherein the stop is engageable with the idle shaft along different locations along the length of the idle shaft, with the location of such engagement dictating the extent to which the idle shaft projects from the mounting housing to be engageable with the longitudinal bore of the brush end structure.

19. A roller brush mounting assembly according to claim 18, wherein the loader assembly comprises a spring acting against the stop to urge the idle shaft into engagement with the longitudinal bore of the brush end structure, the spring being compressible to enable the idle shaft to retract relative to the mounting housing under the movement of the roller brush toward the mounting housing.

20. A roller brush mounting assembly according to claim 19, wherein the spring is engageable over the idle shaft to act against the stop and also bear against an abutment spaced from the stop, thereby to apply a load against a retainer and in turn apply a resilient load on the idle shaft along the length of the idle shaft in the direction toward the brush end structure.

\* \* \* \* \*